US006569798B2

(12) United States Patent
Bello et al.

(10) Patent No.: US 6,569,798 B2
(45) Date of Patent: May 27, 2003

(54) PROCESSES FOR PRODUCING A BLENDED BLEACHING CLAY PRODUCT AND BLENDED BLEACHING CLAY PRODUCTS PRODUCED BY THOSE PROCESSES

(75) Inventors: Jorge Bello, Thomasville, GA (US); Christian Fabry, Tallahassee, FL (US)

(73) Assignee: Sud-Chemie Adsorbents, Inc., Meigs, GA (US)

( * ) Notice: Subject to any disclaimer, the term of this patent is extended or adjusted under 35 U.S.C. 154(b) by 108 days.

(21) Appl. No.: 09/814,575

(22) Filed: Mar. 22, 2001

(65) Prior Publication Data

US 2001/0039683 A1 Nov. 15, 2001

Related U.S. Application Data

(63) Continuation-in-part of application No. 09/337,170, filed on Jun. 21, 1999, now Pat. No. 6,288,003.

(51) Int. Cl.[7] .......................... B01J 20/12; B01J 21/16
(52) U.S. Cl. ........................ 502/72; 502/80; 502/81; 502/83
(58) Field of Search ............... 502/80, 81, 84, 502/83, 85, 72

(56) References Cited

U.S. PATENT DOCUMENTS

| 1,455,995 A | 5/1923 | Cramer |
| 1,492,184 A | 4/1924 | Weir et al. |
| 1,544,210 A | 6/1925 | Bierce |
| 1,716,828 A | 6/1929 | Merrill et al. |
| 1,752,721 A | 4/1930 | Bierce |
| 1,781,265 A | 11/1930 | Baylis |
| 1,792,625 A | 2/1931 | Baylis |
| 1,796,799 A | 3/1931 | Manley et al. |
| 1,844,476 A | 2/1932 | Morrell |
| 1,946,124 A | 2/1934 | Belden et al. |
| 1,949,673 A | 3/1934 | Baylis |
| 2,018,987 A | 10/1935 | Wirzmüller et al |
| 2,477,386 A | 7/1949 | McCarter |
| 2,484,828 A | 10/1949 | Hickey |
| 2,602,807 A | 7/1952 | Morris et al. |
| 2,671,058 A | 3/1954 | Mickelson |
| 2,981,697 A | 4/1961 | Mickelson et al. |
| 3,029,783 A | 4/1962 | Sawyer, Jr. et al. |
| 3,617,215 A | 11/1971 | Sugahara |
| 4,343,751 A * | 8/1982 | Kumar ................. 264/115 |
| 4,847,266 A | 7/1989 | Hansen et al. |
| 5,008,226 A | 4/1991 | Taylor et al. |
| 5,330,946 A | 7/1994 | Hynes et al. |
| 5,468,701 A | 11/1995 | Nebergall et al. |
| 5,783,511 A | 7/1998 | Banin et al. |
| 5,908,500 A * | 6/1999 | Brooks et al. ......... 106/287.17 |
| 6,288,003 B1 * | 9/2001 | Fabry et al. .................. 502/80 |

OTHER PUBLICATIONS

C. Harvey and H. Murray, "Industrial Clays in the 21st Century: A Perspective of Exploration, Technology and Utilization", *Applied Clay Science* 11, pp. 285–310, particularly pp. 302–306 (1997).

* cited by examiner

*Primary Examiner*—Tom Dunn
*Assistant Examiner*—Christina Ildebrando
(74) *Attorney, Agent, or Firm*—Scott R. Cox

(57) ABSTRACT

A process for the production of a bleaching clay product which includes the steps of selecting a naturally occurring, acidic hormite clay product, cleaning and crushing the hormite clay products to form clay clumps, selecting a naturally occurring less acidic, clay product which contains a higher level of montmorillonite than does the acidic hormite clay, aging the crushed hormite clay, blending the aged hormite clay with the less acidic clay product either before or after aging and activating the clay with small quantities of acid. An acceptable bleaching clay product can be produced without activation with acid.

18 Claims, 6 Drawing Sheets

FIGURE 1

| | | Bleaching Activity | | |
|---|---|---|---|---|
| Example | Description | COLOR cell 5-1/4" LOVIBOND SCALE | | Chlorophyll (ppb) |
| | | Reds | Yellow | |
| Ex 1 | TONSIL 350 FF STD | 4.0 | 70.0 | 85 |
| Ex 2 | TONSIL 3501 FF STD | 4.2 | 70.0 | 100 |
| Ex 3 | A2 raw clay           3%$H_2SO_4$ | 3.9 | 70.0 | 102 |
| Ex 4 | A3 altered clay       3%$H_2SO_4$ | 4.4 | 70.0 | 112 |
| Ex 5 | A2 80% / A3 altered 20%   3%$H_2SO_4$ | 4.0 | 70.0 | 96 |
| Ex 6 | A2 60% / A3 altered 40%   3%$H_2SO_4$ | 3.5 | 70.0 | 63 |
| Ex 7 | A2 40% / A3 altered 60%   3%$H_2SO_4$ | 3.8 | 70.0 | 90 |
| Ex 8 | A2 20% / A3 altered 80%   3%$H_2SO_4$ | 3.9 | 70.0 | 100 |

FIGURE 2

```
selecting and cleaning an acidic hormite clay
```

```
crushing the hormite clay
```

```
aging the crushed hormite clay
```

```
selecting, cleaning and crushing a less
acidic clay product which contains a
higher level of montmorillonite
```

```
blending the crushed hormite
clay and the less acidic clay
```

```
drying the clay blend
```

```
milling the dried clay blend to
form the bleaching clay product
```

FIGURE 3

| selecting and cleaning an acidic hormite clay |

| crushing the hormite clay |

| aging the crushed hormite clay |

| selecting, cleaning and crushing a less acidic clay product which contains a higher level of montmorillonite |

| blending the crushed hormite clay and the less acidic clay product |

| acid-treating the clay blend with small quantities of an acid |

| drying the acid-treated clay blend |

| milling the dried clay to form the bleaching clay product |

FIGURE 4

```
selecting and cleaning an acidic hormite clay
```

```
crushing the hormite clay
```

```
selecting, cleaning and crushing a less
acidic clay product which contains a higher
level of montmorillonite
```

```
blending the crushed hormite clay
       and the less acidic clay
```

```
acid-treating the crushed clay blend with
        small quantities of an acid
```

```
drying the acid-treated clay blend
```

```
milling the dried clay blend to form
      the bleaching clay product
```

FIGURE 5

```
selecting and cleaning an acidic hormite clay
```

```
crushing the hormite clay
```

```
selecting, cleaning and crushing a less
acidic clay product which contains a higher
level of montmorillonite
```

```
blending the crushed hormite clay
       and the less acidic clay
```

```
aging the crushed blended clay
```

```
drying the clay blend
```

```
milling the dried clay blend to
form the bleaching clay product
```

FIGURE 6

```
┌─────────────────────────────────────────────┐
│ selecting and cleaning an acidic hormite clay │
└─────────────────────────────────────────────┘

┌─────────────────────────────┐
        │   crushing the hormite clay  │
        └─────────────────────────────┘

┌──────────────────────────────────────┐
    │ selecting, cleaning and crushing a less │
    │ acidic clay product which contains a  │
    │ higher level of montmorillonite       │
    └──────────────────────────────────────┘

┌──────────────────────────────────┐
      │ blending the crushed hormite clay │
      │      and the less acidic clay     │
      └──────────────────────────────────┘

┌────────────────────────────────┐
        │  aging the crushed, blended clay │
        └────────────────────────────────┘

┌────────────────────────────────────────────┐
  │ acid-treating the crushed clay blend with   │
  │         small quantities of an acid         │
  └────────────────────────────────────────────┘

┌────────────────────────────────┐
        │   drying the acid-treated clay blend │
        └────────────────────────────────┘

┌──────────────────────────────────┐
      │  milling the dried clay blend to form │
      │      the bleaching clay product    │
      └──────────────────────────────────┘
```

PROCESSES FOR PRODUCING A BLENDED BLEACHING CLAY PRODUCT AND BLENDED BLEACHING CLAY PRODUCTS PRODUCED BY THOSE PROCESSES

CROSS-REFERENCE TO RELATED APPLICATIONS

This application is a continuation-in-part of application Ser. No. 09/337,170, now U.S. Pat. No. 6,288,003, filed on Jun. 21, 1999.

BACKGROUND OF THE INVENTION

This invention relates to a process for production of a bleaching clay product from a blend of two or more naturally occurring clay products, each of which has different performance characteristics. Specifically, this invention relates to a process for the production of a blended bleaching clay product by combining a naturally acidic hormite clay, aged or non-aged, with a naturally occurring, less acidic clay product, which contains higher levels of montmorillonite clay. In addition, the invention relates to products produced by these processes.

DESCRIPTION OF RELATED ART

It is well known that many naturally occurring clays may be used to decolorize oils. These clays decolorize or bleach various oils, such as mineral oils and vegetable oils; various fractions from petroleum, especially lubricating oils, and can be used for refining used lubricating oils, as well as purifying animal fats and beeswax.

In the early 1900's, it was discovered that the bleaching power of naturally-occurring clays could be enhanced by treating those clays with large quantities of a mineral acid, such as hydrochloric or sulphuric acid, and then washing the acid treated clay free of dissolved salts and residual acid created by the acid treatment. This process is conventionally called acid activation. The general process of acid activation of a clay product includes grinding the clay to a generally uniform, relatively small size, dispersing the clay in water, slurrying the ground clay, and then adding the acid to the clay slurry to form substantially uniform, acid-activated bleaching clay products. This process is disclosed, for example, U.S. Pat. Nos. 1,492,184; 1,781,265; 2,018,987; and 2,671,058.

While many processes are useful for acid activation of various types of clay products, the oils being treated with the acid-activated clay can be damaged if too much acid is utilized during these processes. Because of this adverse effect, it is conventional practice to wash the clay after acid activation to remove any excess acid. However, that washing creates a waste stream containing minerals and acids that are harmful to the environment, which must be neutralized or otherwise disposed of in an environmentally reasonable manner.

U.S. Pat. No. 5,008,226 addressed this issue by limiting the amount of acid that was utilized for activation. Thus, after acid activation, it is claimed that this bleaching clay product need not be washed. This patent teaches the addition of from 1 to 10 percent by weight of concentrated sulfuric acid to certain naturally-occurring, acidic clays containing palygorskite and bentonite. The preferred range of acid addition is between 3 and 5 percent.

A process for producing an acid-activated, decolorizing clay using a naturally occurring, non-acidic clay product is known from U.S. Pat. No. 5,783,511.

Aside from attapulgite clay, bentonite clays can also be activated with acid, but higher concentrations of acid are recommended for activation of bentonite clays than for attapulgite clay. Because of the relatively large amounts of acid used during this acid activation, release of acid by the decolorizing clay to the material being decolorized cannot always be avoided.

A process for acid treatment of an attapulgite clay to produce an improved cat litter is known from U.S. Pat. No. 3,029,783. Relatively low quantities of acid are used in this process, and the acid-treated material is not washed. The material is calcined at 370 to 540° C. (700 to 1000° F.) before acid treatment, with another calcination at about 400 to 590° C. (750 to 1100° F.) occurring after the acid treatment. These treatments are necessary to increase the ability of the attapulgite clay to absorb urine and other body fluids. Use as a decolorizing clay is not discussed.

U.S. Pat. No. 1,492,184 describes a process for the activation of crude clay with acid, wherein the acid constitutes not more than 10 percent by weight of the clay. Calcining is expressly avoided to prevent evaporation of the acid.

A process for acid activating a clay is also disclosed by U.S. Pat. No. 4,847,226. In this process, the clay is extruded and ground, and an aqueous acidic solution is added to produce a suspension. The suspension is heated, and the acid-treated clay is separated, washed, filtered and dried. There is no heat treatment of the acid-activated clay. The intent of this treatment is to improve the ability of the clay to filter impurities from liquids. In particular, oil-soluble dyes are said to be removed from oils using this product.

Numerous patents have disclosed acid treatment of various types of absorbent clays. In these patents, the amount of acid that is utilized varies considerably, based on the type of clay utilized and whether the clay is washed after the acid activation step. However, in most circumstances the amount of concentrated acid added exceeds ten percent (10%) by weight. These patents include: U.S. Pat. Nos. 1,844,476; 1,792,625; 1,796,799; 3,617,215; 1,752,721; 1,716,828; 1,455,995; 1,949,673; 2,602,807; 1,544,210; 2,981,697; 1,946,124; and 2,484,828.

Processes for the regeneration of spent acid-activated bentonite clay are disclosed in U.S. Pat. Nos. 5,468,701 and 5,330,946. See also U.S. Pat. Nos. 2,477,386 and 2,671,058.

While these processes are useful, it is still important to produce improved bleaching clay products activated with low percentages of acid which are effective at bleaching various oils.

Accordingly, it is an object of this invention to disclose a process for the production of a blended, bleaching clay product comprised of two or more types of naturally-occurring clay materials, each with different performance characteristics, whereby small amounts of acid are added to the blended clay products.

It is a still further object of this invention to disclose a process for the production of a blended, bleaching clay product comprised of two or more types of naturally-occurring clay materials, which can be effective for the bleaching of certain types of oils, even with no acid activation.

It is a still further object of this invention to disclose a process for the production of a blended bleaching clay product comprised of two or more types of naturally-occurring clay materials, wherein at least one of the clay minerals can be activated by merely aging that clay mineral in situ without adding any acid.

These and further aspects of the invention will be apparent from the foregoing description of the preferred embodiment of the process and the product produced by that process.

BRIEF DESCRIPTION OF THE INVENTION

One preferred process for the production of a bleaching clay product of this invention comprises selecting a naturally occurring, acidic hormite clay product, selecting a different naturally occurring, clay product with less acidity and higher levels of montmorillonite clay, cleaning the clay products, crushing the cleaned, clay products separately to produce two sets of clay clumps, wherein at least about eighty percent (80%) by weight of the clumps are less than about 2 ins. in diameter, aging the hormite clay clumps for at least about 6 months in situ, blending and drying the two sets of clay clumps together and milling the blended clay clumps to form a bleaching clay product.

An additional preferred process for the production of a bleaching clay product comprises selecting a naturally occurring, acidic hormite clay product, selecting a different naturally occurring, clay product with less acidity and higher levels of montmorillonite clay, cleaning the clay products, blending and crushing the two types of cleaned clay products together to produce blended clay clumps, wherein at least about eighty percent (80%) by weight of the clumps are less than about 2 ins. in diameter, and treating the blended clay clumps with small quantities of concentrated acid. The acid-treated, blended clay product is then dried and milled to form a bleaching clay product. No washing of the bleaching clay product is necessary.

An additional preferred process for the production of a bleaching clay product comprises selecting a naturally occurring, acidic hormite clay product, selecting a different naturally occurring, clay product with less acidity and higher levels of montmorillonite clay, cleaning the clay products, crushing the cleaned clay products separately to produce two sets of clay clumps, wherein at least about eighty percent (80%) by weight of the clumps are less than about 2 ins. in diameter, aging the acidic hormite clay clumps for a period of at least about 6 months, blending the aged hormite clay clumps with clumps of the clay product with less acidity and higher levels of montmorillonite clay, and treating the blended clay clumps with small quantities of a concentrated acid. The acid treated, blended clay product is then dried and milled to form a bleaching clay product.

In addition, the invention includes bleaching clay products produced by these processes.

BRIEF DESCRIPTION OF THE DRAWING

FIG. 1 provides a summary of the performance of the products of Comparative Examples 1 through 4 and inventive Examples 5 through 8.

FIG. 2 is a flow chart of one preferred method for production of a blended bleaching clay product.

FIG. 3 is a flow chart of an alternative preferred method for production of a blended bleaching clay product.

FIG. 4 is a flow chart of a second, alternative preferred method for production of a blended bleaching clay product.

FIG. 5 is a flow chart of a third, alternative preferred embodiment for production of a blended bleaching clay product.

FIG. 6 is a flow chart of a fourth, alternative preferred embodiment for production of a blended bleaching clay product.

DETAILED DESCRIPTION OF THE PREFERRED EMBODIMENT

The invention is a series of processes for the production of blended bleaching clay products.

In one preferred embodiment, the process preferably comprises the steps of:
- selecting an acidic, naturally occurring, raw, hormite clay product;
- cleaning the hormite clay product;
- crushing the cleaned, hormite clay product to a generally uniform size to produce hormite clay clumps;
- aging the hormite clay clumps in situ for a period of at least about six (6) months;
- selecting, cleaning and crushing a different naturally occurring, clay product with less acidity and a higher level of montmorillonite clay,
- blending the aged hormite clay clumps with the less acidic clay clumps,
- drying the blended clay clumps; and
- milling the blended clay clumps to form a bleaching clay product. A schematic of this process is shown in FIG. 2. A schematic of a process where the hormite clay clumps and the less acidic clay clumps are blended prior to aging is shown in FIG. 5.

Preferably, small quantities of an acid are added to the blended clay product during processing to enhance the bleaching capability for various oil products as shown in schematic FIGS. 3, 4 and 6.

One of the starting clay product is an acidic raw hormite clay. Hormite clays contain major proportions of palygorskite and sepiolite. The hormite clay is preferably mined from the Meigs-Attapulgus-Quincy area of Georgia and Florida, particularly around Meigs, Ga. Conventionally, the term "hormite" has been applied to a wide range of clay materials that have been used as absorbents. For purposes of the present invention, the preferred hormite clay is mined from the region around Meigs, Ga., although other similar clay products, which also contain high concentrations of hormite clay, are also included in the present invention.

The composition of this acidic hormite clay is primarily palygorskite (or attapulgite) clay. See C. Harvey and H. Murray, "Industrial Clays in the 21st Century: A Perspective of Exploration, Technology and Utilization", *Applied Clay Science* 11, pp. 285–310, particularly pp. 302–306 (1997). In addition, this raw hormite clay frequently contains small quantities (20 percent or less) of other materials, such as kaolinite, quartz, feldspar and mica. In a preferred embodiment, the raw, hormite clay is composed of at least about 40 to about 80 percent, by weight, palygorskite (or attapulgite) and sepiolite and low percentages of calcium montmorillonite. Additional components of this raw, hormite product, such as kaolinite, quartz, feldspar and mica, should not be greater than about twenty (20) percent. This clay is relatively dark and generally emits an odor of sulfur.

The acidic hormite clay is mined by conventional mining procedures, and has a water content after mining of less than about 60 percent, preferably from about 45 to 55 percent.

After the acidic hormite clay is mined, it is cleaned to remove large rocks and other such gross impurities. In the conventional clay mining process, the overburden is first removed from the natural, hormite clay bed before the acidic hormite clay is mined. Care is taken to separate the hormite clay from the other materials that can be present with the hormite clay, such as rocks, mud, and sand.

Before use, the acidic hormite clay may be aged naturally in the open air. The aging process results in the acidic hormite clay becoming even more acidic. Upon aging for six to nine months or more, the acidity of the aged hormite clay drops to a pH level of about 3 to 3.5 based upon a measurement of the acidity of a 10 percent aqueous solution containing the aged hormite clay. The acidity of the aged hormite clay is from about 1.8 to 3.0 based on the amount of sodium hydroxide in milliequivalents that is necessary to neutralize 100 grams of the aged hormite clay. The cation exchange capacity of the clay when measured using the methylene blue index test is from about 165 to about 175 mg/gram of clay. Because of the low level of acidity and large amount of salts present, the conductivity of this aged hormite clay is substantial, from about 300 to about 400 $\mu$s/cm for a one percent slurry of the clay.

The preferred clay product that is blended with the hormite clay has a similar chemical composition but has significantly different physical properties. In particular this naturally occurring clay product has substantially less acidity than does the aged hormite clay. Its pH is in the range of about 4.2 to about 6.5 when measured in a 10 percent aqueous solution. Its level of acidity is substantially less, ranging from about 0.1 to about 0.5 milliequivalents of sodium hydroxide per 100 grams of clay. Its conductivity is also substantially less than is the conductivity of the aged hormite clay, ranging from about 10 to about 50 $\mu$s/cm. Its cation exchange capacity is also higher than that of the aged clay, ranging from about 180 to about 195 mg/g of clay using the methylene blue index. This enhanced cation exchange capacity is thought to result from the higher levels of montmorillonite clays that are present. The levels of montmorillonite clay are generally at least about 5 percent and preferably at least about 10 percent greater than those of the aged hormite clay. Further, the levels of quartz present in these clays is substantially less than the level of the quartz that is present in the aged hormite clay, preferably 5 percent or less.

This less acidic clay product is generally mined in a similar location as is the hormite clay. However, this clay is lighter in color and does not have the same level of sulfur odor. Further, this clay has a loss of ignition (LOI) at 1,0000° C. at a substantially lower percentage than that of the aged hormite clay.

In one preferred embodiment the blended clay product that forms this invention is primarily a blend of these two different types of clay products. However, the invention is not limited to a blend of only two clay products and may be formed from a blend or three or more clay products, each with different physical, mineralogical or performance characteristics.

After mining, the raw, hormite clay and the less acidic clay product with a higher montmorillonite level are sent separately through a conventional shredder or crusher, such as a Gleason shredder, which crushes the clay products into clumps with a size of about 2 to 3 in. or less. Notwithstanding, depending on the process chosen, the separate clay products may be blended together before they are passed through the shredder. Preferably at least about eighty percent (80%) of the raw clay products are present in clumps which are 2 in. or less in size. In one embodiment, the two or more separate clay products are blended before shredding.

Useful bleaching clay products can be produced from these crushed, blended clay products without aging. Thus, in one preferred embodiment as shown in schematic FIG. 4, the aging step, which is discussed in the following paragraphs, is not utilized. However, in more preferred embodiments as shown in schematic FIGS. 2 and 3, the acidic, hormite clay clumps are aged in situ for an extended period of time before they are blended with the clumps of the less acidic clay product with a higher montmorillonite level. The acidic, hormite clay clumps are preferably placed into large piles and allowed to age naturally in the open air. Preferably, the acidic, hormite clay clumps are aged for at least about six (6) months, and more preferably at least about 12 months or more.

In another preferred embodiment, the acidic, hormite clay clumps are first blended with the clumps of the less acidic clay product with a higher montmorillonite level and then the blended product is aged in the manner discussed above. While the aging process primarily increases the acidity of the raw hormite clay, it also lowers the acidity of the overall blend. This aged, blended clay product may be manufactured into a bleaching clay product without acid activation, as shown in FIG. 5, or with acid activation, as shown in FIG. 6.

After aging, the acidic, hormite clay clumps (or the blended clay clumps if the two or more clay products are blended before the initial shredding) are preferably crushed again in a secondary crusher, such as a jaw-toothed crusher, and optionally a tertiary crusher, such as a roll crusher, to break apart any raw, clay clumps that may exist. After the crushing of the blended clay clumps, the blended clay product is then preferably passed through a kneading process, preferably through a conventional pugmill. It is during this kneading process that the acid, if any, is preferably added to the blended clay products.

The amount of the acidic hormite clay that is blended with the less acidic clay product with higher levels of montmorillonite depends on the bleaching clay product that is ultimately being produced. In one preferred embodiment at least about 20 percent of the blend is comprised of the acidic, hormite clay product and less than 80 percent is comprised of the less acidic clay product with higher levels of montmorillonite. In another preferred embodiment the acidic hormite clay comprises from about 20 to about 80 percent of the blended clay product and the less acidic clay product with higher levels of montmorillonite clay product comprises from about 80 to about 20 percent of the blend. In a further preferred embodiment the acidic, hormite clay product comprises from about 40 to about 60 percent of the blend and the less acidic clay product with higher levels of montmorillonite clay forms about 60 to about 40 percent of the blend.

While in the embodiments shown in schematic FIGS. 2 and 5, useful bleaching clay products can be produced without adding any acid, alternative embodiments, as shown in schematic FIGS. 3, 4 and 6, require the addition of acid to the clay blend. In these embodiments, small quantities of acid are added to the blended clay to enhance its bleaching activity. The acid activation is preferably carried out during the pugmilling of the blended clay, although the acid can be added at any convenient stage in the processing of the clay product. After the acid has been added, the blended clay product and the acid are preferably kneaded together in the pugmill to activate the blended clay. This procedure forms a homogenous mixture of the activating acid and the blended clay product with an overall moisture content of about 55 percent, preferably about 50 percent.

After mixing of the blended clay in the pugmill, it is preferably extruded through a conventional extruder to form extrudates of any conventional size, preferably from about 0.5 inch to about 6.0 inches in length and about 0.2 inch to about 0.8 inch in diameter.

The extruded, blended clay is then dried conventionally by rotary driers or fluid bed driers to reduce its moisture content to about 20 to 30 percent, preferably to about 20 to about 25 percent.

The dried, blended clay is then milled to the appropriate size for use as a bleaching clay product. The milling process is conventional, for example, utilizing a roller mill. The blended clay products are preferably milled so that at least about 95 percent of the resulting products are less than about 100 micron (160 mesh) in size and more preferably 98 percent are less than about 100 micron (160 mesh) in size. The preferred moisture content of the milled product is from about 10 to about 20 percent, by weight.

It has been discovered that the addition of small quantities of acid to the blended clay ultimately produces bleaching clay products with exceptional bleaching properties. In addition, by limiting the quantity of the acid used, there is a reduced likelihood of damage to the oil product which is bleached by the bleaching clay product, and virtually no opportunity for acid runoff during the manufacturing process for producing the bleaching clay product.

Preferably the amount of acid added is about 5 percent or less by weight, based on the dry weight of the blended clay being activated, of a concentrated mineral acid. More preferably the amount of acid used is from about 1 percent to about 5 percent. It has been surprisingly discovered that the use of higher percentages of acid does not enhance the bleaching activity of the blended clay product, and in fact, often reduces the bleaching activity of the bleaching clay product, especially for some oil products.

The acid is preferably added in concentrated form with an acid concentration of about 95 to 97 percent, or so. The acid activation is preferably done with a mineral acid, such as sulfuric acid, hydrochloric acid, nitric acid or phosphoric acid. Sulfuric acid is preferred, as it does not evaporate during either the acid activation step or the beginning of the final drying step. This permits a more complete activation of the hormite clay. Phosphoric acid has a similar action, as poorly soluble aluminum phosphate is formed. However, it does not migrate into the pores as easily. This disadvantage can be eliminated by using a mixture of sulfuric acid and phosphoric acid.

Hydrochloric acid is less desirable as an activating acid, as it evaporates during activation and forms soluble salts, which can be washed out of the micropores of the clay product. Hydrochloric acid can be used, however, if the activation is done at elevated pressures. These disadvantages can also be eliminated by using a mixture of sulfuric acid and hydrochloric acid. After the acid is added to the blended clay product, the blended clay is mixed and kneaded, as discussed above. Because of the use of small percentages of acid, no washing of the blended clay product is necessary to remove excess acid.

Activation can be done at room temperature or at slightly elevated temperatures. Processing at elevated temperatures allows the acid to migrate into the micropores of the blended clay and be deposited therein.

After the blended clay has been milled, it is processed conventionally. For example, the milled, blended clay products are preferably treated to remove "fines". The fines may be reintroduced to the processing of the blended clay during any convenient processing step, preferably during the kneading step. The blended clay product is then packaged for shipment, either in bags, or in bulk containers for large shipments of the product.

It has also been surprisingly discovered that a high quality, bleaching clay product can be produced even if the aging step is eliminated from the above-referenced process as shown in schematic FIG. 4. In this alternative preferred process, the naturally occurring, acidic hormite clay product is mined, cleaned and crushed, as discussed above, to produce clumps wherein at least about eighty percent (80%) of the clumps are crushed to a size less than about 2 in. in diameter. Instead of aging the crushed hormite clay prior to blending, however, it is immediately blended with the less acidic clay product with a higher level of montmorillonite as discussed above and activated with an acid. The blend is then dried to a moisture content of from about 20 to about 30 percent and milled to a size useful as a bleaching clay product, as discussed above. While the blended clay product produced by this process without aging often has a higher pH than the blended clay product discussed above that is treated with an acid, and may also have slightly less bleaching activity than its counterpart, it is still useful for the removal of colored impurities from certain types of oils. Further, this acid-activated, non-aged blended bleaching clay is quite useful as a bleaching clay product, even when the amount of acid added to the clay product is 5 percent or less.

The products produced by these processes are particularly useful for the decolorizing of food, fats and oils, such as olive oil, linseed oil, soybean oil, canola oil, cottonseed oil, tallow oil, sunflower oil, coconut oil, palm oil, and grapeseed oil, as well as waste petroleum oils. The products according to the invention absorb colored impurities such as chlorophyll, carotinoids, or xanthophyll. Phospholipids in the fats and oils are also absorbed.

EXAMPLES

The invention is explained by the following examples.

Process of Comparative Examples 1–4 and Inventive Examples 5–8

A natural occurring acidic hormite clay from Meigs, Ga., was mined. The mined clay was cleaned by bulldozer/excavator, and then crushed to form acidic hormite clay clumps with a size less than about 2 in. in diameter. The acidic hormite clay clumps were then aged for 6 to 18 months. The aged hormite clay clumps were then crushed a second time to a size of less than about 2 in. A naturally occurring less acidic clay product with a higher level of montmorillonite from Meigs, Ga. was also mined from a different layer in the mine than the acidic hormite clay. This less acidic clay product with a higher level of montmorillonite was cleaned by bulldozer/excavator and then crushed to form less acidic clay clumps with a higher level of montmorillonite with a size less than about 2 in. in diameter. The aged hormite clay clumps and the clumps of the less acidic clay product with a higher level of montmorillonite were then blended and crushed together to a size less than about 2 inches. The blended clay was treated with about 3 percent by weight of concentrated sulfuric acid.

The acid was added as the crushed clays were passed through a conventional pugmill. The acid was added by spray nozzles which were located in the top section of the pugmill. A flow meter was used to add the right amount of acid, which was stored in a tank adjacent to the pugmill. Once the clays entered the pugmill, the acid was sprayed onto the clays. The clay/acid mixture was then kneaded as it passed through the pugmill. Upon exiting the pugmill, it passed through a bedeshi extruder, where the acid and the clay were intimately mixed and sheared. The clay extrudates then exited the extruder where they were transported to the drier. The extrudate was about 3–6 inches in length and about 0.5 inch in diameter. The treated clay was then dried to a water content of about 20 to about 30 percent conventionally by use of a rotary drum or a fluid bed drier. The blended clay was then milled to an appropriate size for use as a bleaching clay product. The milling process was conventional utilizing a roller mill. The milled clay products were milled so that at least 95 percent of the resulting products were less than about 160 mesh (100 micron) in size.

The performance of the clay blends treated with 3.0 percent concentrated sulfuric acid are shown on FIG. 1 for Inventive Examples 5–8. Each of these examples comprise clay with a different blend of the aged, acidic hormite clay (altered A3) and the less acidic clay with a higher level of montmorillonite (A2). Comparative Example 3 shows the performance of the acid activated clay (A2) alone. Comparative Example 4 shows the performance of the acid activated, aged hormite clay alone. Comparative Examples 1 and 2 show the performance of two commercial bleaching earth products sold by Süd-Chemie Adsorbents, TONSIL 350 and TONSIL 3501.

The clay products were tested for absorption of red and yellow colors and chlorophyll using a Lovibond Tintometer PFX990 using conventional testing procedures. A Color-Scale, which is called a "Lovibond colors R, X, B and H" is used to measure the content of reds, yellows, blues and neutral colors. The results of these tests are shown on FIG. 1.

FIG. 1 can be interpreted as follows: The base oil, soybean oil, which is not bleached, had a preliminary red value of 9.8, a yellow value of 70 and contains 1063 ppb chlorophyll. After treating the base oil with the various bleaching clays, these values dropped substantially. As a result the oil was clearer. The lower the number for reds, yellows and chlorophyll, the better the oil and the better the bleaching clay which was utilized.

As is clear from these examples, the performance of the blended clay-based bleaching clay products produced by the processes of the invention was very good. In fact, the performance of the blended clays were surprisingly better than the performance of either of the clays that were blended where used individually as shown in Comparative Examples 3 and 4.

The residual acidity in the clay samples was determined using the following procedure:

I. Objective

To provide instructions for determining the percentage of free acid calculated as sulfuric acid in a clay sample.

II. Scope

The scope covers preparing the sample for analysis and analyzing the sample once it is in the lab for acid concentration of a clay sample.

III. Generalities 3.1 Lab Equipment and Materials 3.1.1. 0.1% bromophenol blue solution 3.1.2. Erlenmeyer glass beaker, 250 ml 3.1.3. Graduated burette, 25 ml 3.1.4 250 ml beaker 3.1.5. Weigh paper, 6×6

3.1.6. Small plastic scoop 3.1.7. Distilled Water 3.1.8. NaOH solution, 0.1N 3.1.9. 1% Phenolphthalein 3.1.10. Hot plate 3.1.11. pH meter—with 4 & 7 buffer and wipes 3.1.12. 250 ml graduated cylinder 3.1.13. 100 ml graduated cylinder 3.1.14. 185 mm fluted filter paper 3.1.15. 100 ml beaker 3.1.16. Analytical balance—precision 0.01 g 3.1.17. 10 ml pipette IV. Procedures 4.1 Residual Acidity of a Clay Sample 4.1.1. Weigh 20 g of sample, previously milled to less than 2.0 mm on a tarred piece of weigh paper using the analytical balance. Weigh to an accuracy of 0.001 g. Pour the sample into a 250 ml Erlenmeyer flask containing 200 ml distilled water.

4.1.2. Heat this mixture to boiling on the hot plate. It takes approximately 20 minutes on the hot plate.

4.1.3. Pour the heated mixture into the fluted filter paper to remove the solid material. The fluted filter paper is placed in a small plastic funnel that is placed into the 100 ml graduated cylinder.

4.1.4. Take 100 ml of the filtrate and transfer it to a 250 ml erlenmeyer flask. To this flask with filtrate add 4–6 drops of a 1% solution of phenolphthalein/ethanol indicator.

4.1.5. Titrate with a volumetric solution of sodium hydroxide (0.1 N) until the solution changes from a clear to a pink color. Record the volume of titrant used.

4.2 Calculations 4.2.1 To calculate the residual acidity in percent, use the following formula:

$$\text{Residual Acidity of } \% = \frac{\text{ml NaOH} \times N \times 0.04904}{\text{g of sample}} \times 100$$

While the invention has been described in terms of the various preferred embodiments, these should not be construed as limitations on the scope of the invention. Many other variations, modifications, substitutions and changes may be made without departing from the scope of the invention.

We claim:

1. A process for producing a bleaching clay product comprising selecting and cleaning a naturally occurring, acidic, hormite clay product;

crushing the cleaned, hormite clay product to produce hormite clay clumps;

aging the hormite clay clumps for a period of at least 6 months;

selecting, cleaning and crushing a naturally occurring, less acidic, clay product with a higher level of montmorillonite than is present in the hormite clay to produce less acidic clay clumps;

blending the aged hormite clay clumps with the less acidic clay clumps;

drying the blended clay clumps; and milling the dried, clay clumps to form the bleaching clay product.

2. The process of claim 1 wherein the dried, clay clumps have a water content of from about 20 to 30 percent.

3. The process of claim 1 wherein the aged hormite clay comprises at least about 20 percent of the blended clay clumps.

4. The process of claim 1 wherein the less acidic clay comprises at least about 20 percent of the blended clay clumps.

5. The process of claim 1 wherein the less acidic clay product contains at least 5 percent more montmorillonite clay than is present in the acidic hormite clay.

6. A process for producing a bleaching clay product comprising selecting and cleaning a naturally occurring, acidic, hormite clay product;

crushing the cleaned, hormite clay product to produce hormite clay clumps;

aging the hormite clay clumps for a period of at least 6 months;

selecting, cleaning and crushing a naturally occurring, less acidic, clay product with a higher level of montmorillonite than is present in the hormite clay to produce less acidic, clay clumps;

blending the aged hormite clay clumps with the less acidic clay clumps;

treating the blended clay clumps with a concentrated acid;

drying the treated clay clumps; and milling the dried, treated clay clumps to form the bleaching clay product.

7. The process of claim 6 wherein the aged hormite clay comprises at least about 20 percent of the blended clay clumps.

8. The process of claim 6 wherein the less acidic clay comprises at least about 20 percent of the blended clay clumps.

9. The process of claim 6 wherein the less acidic clay product contains at least 5 percent more montmorillonite clay than is present in the acidic hormite clay.

10. A process for producing a bleaching clay comprising selecting, cleaning and crushing a naturally occurring, acidic hormite clay product;

selecting, cleaning and crushing a naturally occurring, less acidic, clay product with a higher level of montmorillonite than is present in the hormite clay to produce less acidic clay clumps;

blending the hormite clay clumps with the less acidic clay clumps to form blended clay clumps;

aging the blended clay clumps for a period of at least 6 months;

treating the aged clay clumps with a concentrated acid;

drying the acid-treated, clay clumps; and milling the dried clay clumps to form the bleaching clay product.

11. The process of claim 10 wherein the dried clay clumps have a water content of from about 20 to 30 percent.

12. The process of claim 10 wherein the hormite clay comprises at least about 20 percent of the blended clay clumps.

13. The process of claim 10 wherein the less acidic clay comprises at least about 20 percent of the blended clay clumps.

14. The process of claim 10 wherein the less acidic clay product contains at least 5 percent more montmorillonite clay than is present in the acidic hormite clay.

15. A process for producing a bleaching clay comprising selecting, cleaning and crushing a naturally occurring acidic hormite clay product to produce clay clumps;

selecting, cleaning and crushing a naturally occurring, less acidic, clay product with a higher level of montmorillonite than is present in the hormite clay to produce less acidic clay clumps;

blending the hormite clay clumps with the less acidic clay clumps;

aging the blended clay clumps for a period of at least 6 months;

drying the aged clay clumps; and milling the dried clay clumps to form the bleaching clay product.

16. The process of claim 15 wherein the acidic hormite clay comprises at least about 20 percent of the blended clay clumps.

17. The process of claim 15 wherein the less acidic clay comprises at least about 20 percent of the blended clay clumps.

18. The process of claim 15 wherein the less acidic clay product contains at least 5 percent more montmorillonite clay than is present in the acidic hormite clay.

* * * * *